US008466084B2

(12) United States Patent
Yoo et al.

(10) Patent No.: US 8,466,084 B2
(45) Date of Patent: Jun. 18, 2013

(54) NON-NOBLE METAL BASED CATALYST AND FUEL CELL INCLUDING THE NON-NOBLE METAL BASED CATALYST

(75) Inventors: Duckyoung Yoo, Seoul (KR); Gang Liu, Dalian (CN); Huamin Zhang, Dalian (CN); Hong Jin, Dalian (CN); Ting Xu, Dalian (CN); Yuanwei Ma, Dalian (CN); Hexiang Zhong, Dalian (CN)

(73) Assignees: Samsung Electronics Co., Ltd. (KR); Dalian Institute of Chemical Physics, Chinese Academy of Sciences (KR)

( * ) Notice: Subject to any disclaimer, the term of this patent is extended or adjusted under 35 U.S.C. 154(b) by 485 days.

(21) Appl. No.: 12/708,687

(22) Filed: Feb. 19, 2010

(65) Prior Publication Data

US 2010/0216056 A1 Aug. 26, 2010

(30) Foreign Application Priority Data

Feb. 20, 2009 (CN) .......................... 2009 1 0118734
Mar. 13, 2009 (KR) ........................ 10-2009-0021860

(51) Int. Cl.
*B01J 23/00* (2006.01)

(52) U.S. Cl.
USPC ............................................. 502/308; 502/349

(58) Field of Classification Search
USPC .................................... 429/128; 502/308, 349
See application file for complete search history.

(56) References Cited

FOREIGN PATENT DOCUMENTS

| DE | 102006018529 A1 | 11/2007 |
| EP | 0 552 133 | 1/1993 |
| JP | 2006-334542 | 12/2006 |
| JP | 2007273161 A | 10/2007 |

*Primary Examiner* — Edward Johnson
(74) *Attorney, Agent, or Firm* — Cantor Colburn LLP

(57) ABSTRACT

A non-noble metal based catalyst includes a compound represented by Formula 1:

$$Zr_a M_b O_x N_y \qquad \text{[Formula 1]}$$

where M is at least one element selected from Group 4 elements through Group 12 elements, a is a number in the range of about 1 to about 8, b is a number in the range of 1 to 8, x is a number in the range of about 0.2 to about 32, and y is a number in the range of about 0.2 to about 16. A fuel cell electrode and fuel cell may be formed using the non-noble metal based catalyst.

16 Claims, 7 Drawing Sheets

US 8,466,084 B2

NON-NOBLE METAL BASED CATALYST AND FUEL CELL INCLUDING THE NON-NOBLE METAL BASED CATALYST

CROSS-REFERENCE TO RELATED APPLICATIONS

This application claims the benefits of Korean Patent Application No. 10-2009-0021860, filed on Mar. 13, 2009, in the Korean Intellectual Property Office, and Chinese Patent Application No. 200910118734.9, filed on Feb. 20, 2009, in the Chinese Intellectual Property Office, the disclosures of which are incorporated herein in their entirety by reference.

BACKGROUND

1. Field

One or more embodiments relate to a non-noble metal based catalyst, a method of manufacturing the same, a fuel cell electrode including the non-noble metal based catalyst, and a fuel cell including the non-noble metal based catalyst.

2. Description of the Related Art

Conventionally, solid polymer electrolytic fuel cells use, as an electrode catalyst, metal microparticles that mainly include noble metals having excellent catalytic activity and high potential, such as platinum (Pt).

However, Pt is a rare metal and thus is expensive. Therefore, there is a need to replace Pt with other highly active electrode catalysts for fuel cells.

To reduce the amount of Pt used, an additive such as zirconium oxide can be additionally used (see EP 552133), or a transition metal oxynitride can be attached to the surface of a support by sputtering in order to produce a transition metal oxynitride electrode catalyst (see JP 2006-334542).

However, conventional non-noble based electrode catalysts have unsatisfactory levels of activity and thus fuel cells using non-noble based electrode catalysts have poor performance.

SUMMARY

One or more embodiments include a non-noble metal based catalyst having excellent activity and a method of manufacturing the same.

One or more embodiments include a fuel cell electrode including the non-noble metal based catalyst and a fuel cell including the non-noble metal based catalyst.

Additional aspects will be set forth in part in the description which follows and, in part, will be apparent from the description, or may be learned by practice of the invention.

To achieve the above and/or other aspects, one or more embodiments may include a non-noble metal based catalyst comprising a compound represented by Formula 1:

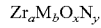  [Formula 1]

where M comprises at least one element selected from Group 4 elements through Group 12 elements,
  a is a number in the range of about 1 to about 8,
  b is a number in the range of about 1 to about 8,
  x is a number in the range of about 0.2 to about 32, and
  y is a number in the range of about 0.2 to about 16.

To achieve the above and/or other aspects, one or more embodiments may include a method of manufacturing a non-noble metal based catalyst, the method comprising:
  mixing precursors of a compound represented by Formula 1 and solvents to prepare precursor solutions, respectively;
  mixing a carbonaceous support and a solvent to prepare a support slurry;
  mixing the precursor solutions and the support slurry, thereby obtaining a mixed product;
  drying and nitrifying the mixed product, thereby obtaining a nitrification product; and
  cooling the nitrification product to room temperature.

To achieve the above and/or other aspects, one or more embodiments may include an electrode for a fuel cell, the electrode comprising the non-noble metal based catalyst.

To achieve the above and/or other aspects, one or more embodiments may include a fuel cell comprising: a cathode; an anode; and an electrolytic membrane interposed between the cathode and the anode,
  wherein at least one of the cathode and the anode comprises the non-noble metal based catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
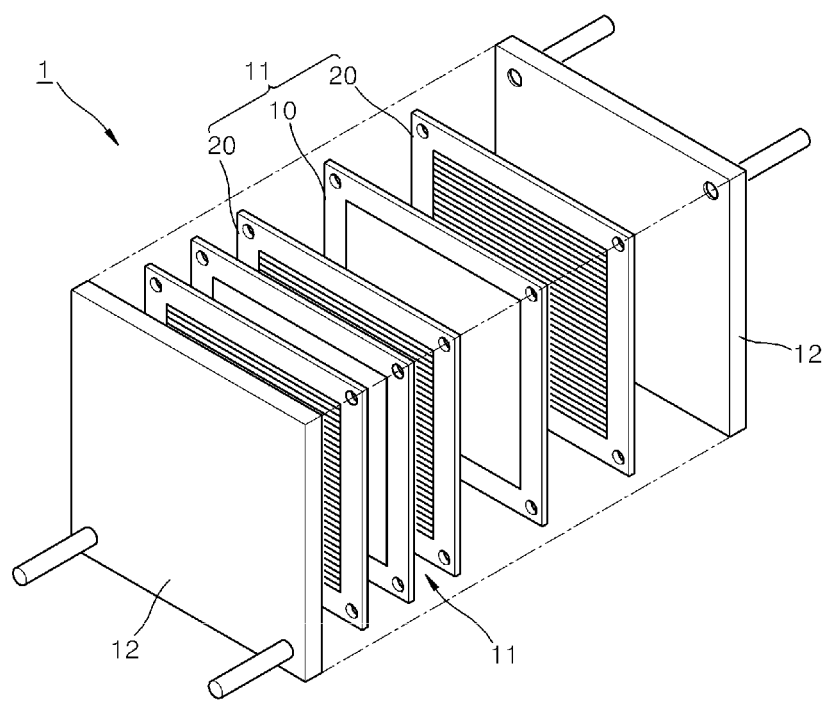
FIG. 1 is an exploded perspective view of a fuel cell according to an embodiment.

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

An embodiment provides a non-noble metal based catalyst including a compound represented by Formula 1 below. The compound represented by Formula 1 is an active component.

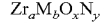  [Formula 1]

where M includes at least one element selected from Group 4 elements through Group 12 elements,
  a is a number in the range of about 1 to about 8,
  b is a number in the range of about 1 to about 8,
  x is a number in the range of about 0.2 to about 32, and
  y is a number in the range of about 0.2 to about 16.

In Formula 1, when M includes at least two kinds of elements, the compound represented by Formula 1 may be represented by Formula 2. The compound represented by Formula 2 is an active component.

$$Zr_aM1_cM2_dO_xN_y \quad \text{[Formula 2]}$$

where M1 and M2 are different metals selected from Group 4 elements to Group 12 elements,
  a is a number in the range of about 1 to about 8,
  c is a number in the range of about 1 to about 8,
  d is a number in the range of about 1 to about 8,
  x is a number in the range of about 0.2 to about 48, and
  y is a number in the range of about 0.2 to about 48.

With respect to Formula 1, M may include at least one element selected from the group consisting of titanium (Ti), vanadium (V), chromium (Cr), manganese (Mn), molybdenum (Mo), tungsten (W), iron (Fe), cobalt (Co), nickel (Ni), copper (Cu), and zinc (Zn).

In Formula 1, the mixed atomic ratio of zirconium (Zr) to M may be in a range of about 1:8 to about 8:1.

The non-noble metal based catalyst may further include a carbonaceous support.

Examples of the carbonaceous support include graphite carbon, carbon black, charcoal, carbon nanotubes, carbon nanofiber, carbon microspheres, and carbon aerogel.

In the non-noble metal based catalyst according to an embodiment, the amount of the compound represented by Formula 1 may be in a range of about 5 to about 80 parts by weight based on 100 parts by weight of the total weight of the non-noble metal based catalyst. If the amount of the compound represented by Formula 1 is less than 5 parts by weight, or greater than 80 parts by weight, based on 100 parts by weight of the total weight of the non-noble metal based catalyst, activity of the non-noble metal based catalyst may be degraded.

The average particle size of the active component may be in a range of about 1 nm to about 50 nm. If the average particle size of the active component is less than 1 nm or greater than 50 nm, activity of the non-noble metal based catalyst may be degraded.

The compound represented by Formula 1 may be $Zr_4Co_1O_xN_y/C$, $Zr_4Fe_1O_xN_y/C$, $Zr_5Cu_1O_xN_y/C$, $Zr_3Ni_1O_xN_y/C$, $Zr_3Cr_1O_xN_y/C$, $Zr_2Zn_1O_xN_y/C$, $Zr_1Ti_1O_xN_y/C$, $Zr_1V_2O_xN_y/C$, $Zr_1Mn_1O_xN_y/C$, $Zr_1Mo_4O_xN_y/C$, $Zr_1W_5O_xN_y/C$, $Zr_2Fe_5O_xN_y/C$, or $Zr_1Co_{10}O_xN_y/C$, wherein x is a number in the range of about 0.2 to about 32, and y is a number in the range of about 0.2 to about 16.

The compound represented by Formula 2 may be $Zr_8Co_1Mn_1O_xN_y/C$, $Zr_6Fe_2Mn_1O_xN_y/C$, $Zr_8Fe_1Co_1O_xN_y/C$, $Zr_6Fe_1Zn_1O_xN_y/C$, $Zr_6Ni_1Zn_1O_xN_y/C$, or $Zr_6V_1Zn_1O_xN_y/C$, wherein x and y are numbers in the range of about 0.2 to about 48.

In the compounds described above, the amount of the active component may be from about 5 to about 80 parts by weight based on 100 parts by weight of the total weight of the non-noble metal based catalyst. For example, the amount of the active component may be from about 10 to about 30 parts by weight based on 100 parts by weight of the total weight of the non-noble metal based catalyst Hereinafter, a method of manufacturing the non-noble metal based catalyst, according to an embodiment, will now be described in detail.

First, a precursor of a compound represented by Formula 1 is mixed with a first solvent to prepare a precursor solution.

The precursor of the compound represented by Formula 1 may be a nitrate, a sulfate, an acetate, a halide, an acetylacetone salt, or a macrocyclic complex selected from a group consisting of porphyrin and phthalocyanine, each of which includes an element selected from Group 4 elements through Group 12 elements.

Examples of the precursor of the compound represented by Formula 1 include $Co(NO_3)_2 \cdot 6H_2O$, $Fe(NO_3)_2 \cdot 6H_2O$, $ZrO(NO_3)_2 \cdot 2H_2O$ or a mixture thereof.

The first solvent includes at least one solvent selected from water and C1-C8 alcohols. Examples of the C1-C8 alcohols include methanol, ethanol, and isopropyl alcohol.

The amount of the first solvent may be in a range of about 50 to about 2000 parts by weight based on 1 part by weight of the precursor of the compound represented by Formula 1.

Separately, a carbonaceous support is mixed with a second solvent to prepare a support slurry.

Like the first solvent, the second solvent may include at least one solvent selected from water and C1-C8 alcohols. The amount of the second solvent may be in a range of about 20 to about 100 parts by weight based on 1 part by weight of the carbonaceous support.

The amount of the carbonaceous support may be in a range of about 5 to about 500 parts by weight based on 1 part by weight of the precursor of the compound represented by Formula 1.

The precursor solution is mixed with the support slurry. In this regard, the mixing of the precursor solution and the support slurry may be performed at a temperature of 70 to 100° C. If the mixing temperature is lower than 70° C. or higher than 100° C., catalyst particles on the carbonaceous support may be too big and the size distribution of the catalyst particles may be too large.

The mixed product is dried at a temperature of 60 to 100° C., and then nitrified.

The nitrification may be performed by heat-treating in an environment including $NH_3/N_2$ or $N_2/O_2$ at a temperature of about 300 to about 1000° C.

Then, the resultant is cooled to room temperature to produce a non-noble metal based catalyst in which the compound represented by Formula 1 is supported on the carbonaceous support.

As described above, the non-noble metal based catalyst can be easily manufactured. Also, the non-noble metal based catalyst is non-toxic and environmentally friendly. The non-noble metal based catalyst may be used in an electrode for a fuel cell.

An electrode for a fuel cell according to an embodiment includes the non-noble metal based catalyst described above and a binder.

The binder may be any material that provides a binding force to an electrode catalyst layer so that the electrode catalyst layer binds to a collector. Examples of the binder include poly(vinylidenefluoride), polytetrafluoroethylene(PTFE), a tetrafluoroethylene-hexafluoroethylene copolymer, fluorinated ethylene propylene (FEP), styrene butadiene rubber (SBR), and polyurethane. The amount of the binder may be in a range of about 0.001 to about 0.5 parts by weight based on 1 part by weight of the non-noble metal based catalyst. If the amount of the binder is less than 0.001 parts by weight based on 1 part by weight of the non-noble metal based catalyst, a wetting state of the electrode may be insufficiently improved. On the other hand, if the amount of the binder is greater than 0.5 parts by weight based on 1 part by weight of the non-noble metal based catalyst, flooding may occur.

A method of manufacturing the electrode for a fuel cell according to an embodiment will now be described in detail.

First, a non-noble metal based catalyst, a solvent, and a binder are mixed to prepare a composition for forming an electrode catalyst layer.

Examples of the solvent include N-methylpyrrolidone (NMP) and dimethylacetamide (DMAc). The amount of the solvent may be in a range of about 1 to about 10 parts by weight based on 1 part by weight of the non-noble metal based catalyst.

The composition for forming the electrode catalyst layer is coated onto a carbon support to form an electrode. In this regard, the carbon support may be fixed on a glass substrate to easily perform the coating process. The coating process may be performed using a doctor blade, bar-coating, or screen-printing. However, the coating process may also be performed using other methods.

The coated composition may be dried to remove the solvent. The drying temperature may be in a range of about 20 to about 150° C. The drying temperature may vary according to the drying time. In this regard, the drying time may be in a range of about 10 minutes to about 60 minutes.

The electrode according to aspects of the present embodiment, manufactured as described above, may further include a proton conductor that functions as a dopant. The proton conductor may be a phosphoric acid or an organic phosphonic acid.

Examples of the phosphoric acid include a metaphosphoric acid, an orthophosphoric acid, a paraphosphoric acid, a triphosphoric acid, and a tetraphosphoric acid. For example, the phosphoric acid may be an orthophosphoric acid. Examples of the organic phosphonic acid include: C1-C10 alkyl phosphonic acids, such as a methylphosphonic acid, an ethylphosphonic acid, or a propylphosphonic acid; a vinylphosphonic acid; or a phenylphosphonic acid. For example, the organic phosphonic acid may be a vinylphosphonic acid.

In some embodiments, when the phosphoric acid or organic phosphonic acid, which function as an electrolyte, is used in an aqueous state, the concentration of the phosphoric acid aqueous solution or organic phosphonic acid aqueous solution may be in a range of about 20 to about 100 weight %.

Figure 2:
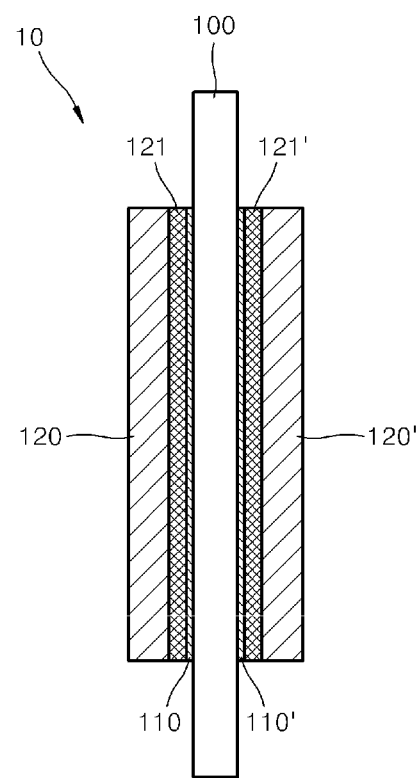
FIG. 2 is a schematic sectional view of a membrane-electrode assembly (MEA) of the fuel cell of FIG. 1, according to an embodiment.

FIG. 1 is an exploded perspective view of a fuel cell 1 according to an embodiment, and FIG. 2 is a schematic sectional view of a membrane-electrode assembly (MEA) 10 of the fuel cell 1 of FIG. 1.

Referring to FIG. 1, the fuel cell 1 according to the present embodiment includes two unit cells 11 interposed between a pair of holders 12. Each of the unit cells 11 includes the MEA 10 and bipolar plates 20, wherein the MEA 10 is interposed between the bipolar plates 20 aligned in a thickness direction of the MEA 10. The bipolar plates 20 may be formed of a conductive metal or carbon. Each of the bipolar plates 20 contacts the MEA 10 so as to function as a collector and supply oxygen and a fuel to catalyst layers of the MEA 10.

Although the fuel cell 1 illustrated in FIG. 1 includes only two unit cells, the number of unit cells is not limited to 2. For example, according to characteristics required of a fuel cell, the number of unit cells may a few to several hundred. Moreover, it is to be understood that a fuel cell according to aspects of the present invention may vary from what is shown in FIG. 1

Referring to FIG. 2, the MEA 10 includes a fuel cell polymer electrolytic membrane 100 (hereinafter referred to as "electrolytic membrane"), catalyst layers 110 and 110' aligned in a thickness direction of the electrolytic membrane 100 on opposite sides of the electrolytic membrane 100 respectively, first gas diffusion layers 121 and 121' respectively disposed on the catalyst layers 110 and 110', and second gas diffusion layers 120 and 120' respectively disposed on the first gas diffusion layers 121 and 121'.

The catalyst layers 110 and 110' function as a fuel electrode and an oxygen electrode respectively. Each of the catalyst layers 110 and 110' includes a catalyst, a material that may increase an electrochemical surface of the catalyst, and a binder.

Each of the first gas diffusion layers 121 and 121' and second gas diffusion layers 120 and 120' may be formed of, for example, a carbon sheet or a carbon paper, and allows oxygen and a fuel supplied through the bipolar plates 20 and 20 to diffuse into the entire surface of the catalyst layers 110 and 110'.

It is to be understood that an MEA of a fuel cell according to aspects of the present invention may vary from what is shown in FIG. 2. For example, the number and arrangement of the catalyst and diffusion layers on respective sides of the electrolytic membrane may differ from what is shown in FIG. 2 and separate layers depicted in FIG. 2 may be combined into a single layer.

The fuel cell 1 including the MEA 10 typically operates at a temperature of 100 to 300° C. For the fuel cell 1, a fuel such as, for example, hydrogen is supplied through the bipolar plate 20 on one of the catalyst layers 110 and 110' side and an oxidant such as, for example, oxygen is supplied through the bipolar plate 20 on the other catalyst layer side. The hydrogen is oxidized to generate protons in one catalyst layer and the protons move to the other catalyst layer through the electrolytic membrane 100, and meanwhile, in the other catalyst layer, protons electrochemically react with oxygen to generate water and electrical energy.

The hydrogen, constituting the fuel, may be supplied in a form of hydrocarbon or hydrogen generated by modifying alcohol, and oxygen, constituting the oxidant, may be supplied from air.

The electrolytic membrane 100 included in the MEA 11 will now be described in detail.

The electrolytic membrane 100 may be formed of any electrolyte that is commercially used in a fuel cell. For example, the electrolytic membrane may be formed of polybenzimidazole, polybenzoxazine-polybenzimidazole copolymer, or PTFE.

The electrolytic membrane 100 may further include, in addition to those polymers described above, other electrolytes. For example, the electrolytic membrane 100 may further include a phosphoric acid and an organic phosphonic acid, which have been described with reference to the proton conductor described above.

Hereinafter, the above embodiments will now be described with reference to the following examples. However, these examples are for illustrative purposes only and are not intended to limit the scope of the invention.

SYNTHESIS EXAMPLE 1

Preparation of $Zr_4Co_1O_xN_y/C$ where x is 0.2 and y is 1

2.94 ml of a cobalt nitrate solution prepared by adding water to 4.73 mg of $Co(NO_3)_2.6H_2O$ and stirring the mixture is mixed with 3.29 ml of a zirconium nitrate solution prepared by adding water to 28.16 mg of $ZrO(NO_3)_2.2H_2O$ and stirring the mixture, thereby preparing a precursor solution.

Separately, 0.4 g of XC-72, which is a form of carbon black, is mixed with 80 parts by volume of water based on 20 parts by volume of ethanol to prepare a support slurry.

The precursor solution is mixed with the support slurry at 90° C. in an oil bath for 30 minutes and the resultant mixture is dried at 80° C. for 8 hours in a vacuum condition.

The result is heat treated at 900° C. for 30 minutes under an ammonia gas atmosphere, and then cooled to room temperature (20° C.) under a nitrogen atmosphere, thereby producing $Zr_4Co_1O_xN_y/C$ where x is 0.2 and y is 1. In this case, the amount of $Zr_4Co_1O_xN_y$ that is an active component is 20 parts by weight based on 100 parts by weight of the total weight of the catalyst.

SYNTHESIS EXAMPLE 2

Preparation of $Zr_4Fe_1O_xN_y/C$ (x=0.2, y=1)

2.45 ml of an iron nitrate solution prepared by adding water to 5.42 mg of $Fe(NO_3)_2.6H_2O$ and stirring the mixture is mixed with 3.31 ml of a zirconium nitrate solution prepared by adding water to 26.18 mg of $ZrO(NO_3)_2.2H_2O$ and stirring the mixture, thereby preparing a precursor solution.

Separately, 0.4 g of XC-72 carbon black is mixed with 80 parts by volume of water based on 20 parts by volume of ethanol to prepare a support slurry.

The precursor solution is mixed with the support slurry at 90° C. in an oil bath for 30 minutes and the resultant mixture is dried at 80° C. for 8 hours in a vacuum condition.

The result is heat treated at 900° C. for 30 minutes under an ammonia gas atmosphere, and then cooled to room temperature (20° C.) under a nitrogen atmosphere, thereby producing $Zr_4Fe_1O_xN_y/C$ (x=0.2, y=1). In this case, the amount of $Zr_4Fe_1O_xN_y$ that is an active component is 20 parts by weight based on 100 parts by weight of the total weight of the catalyst.

SYNTHESIS EXAMPLE 3

Preparation of $Zr_8Fe_1Co_1O_xN_y/C$ where x is 0.2 and y is 1

0.87 ml of an iron nitrate solution prepared by adding water to 20.36 mg of $Fe(NO_3)_2.6H_2O$ and stirring the mixture, 0.73 ml of a cobalt nitrate solution prepared by adding water to 25.46 mg of $Co(NO_3)_2.6H_2O$ and stirring the mixture, and 8.8 ml of a zirconium nitrate solution prepared by adding water to 26.18 mg of $ZrO(NO_3)_2.2H_2O$ are mixed together, thereby preparing a precursor solution.

Separately, 0.4 g of XC-72 carbon black is mixed with 80 parts by volume of water based on 20 parts by volume of ethanol to prepare a support slurry.

The precursor solution is mixed with the support slurry at 90° C. in an oil bath for 30 minutes and the resultant mixture is dried at 80° C. for 8 hours in a vacuum condition.

The result is heat treated at 900° C. for 30 minutes under an ammonia gas atmosphere, and then cooled to room temperature (20° C.) under a nitrogen atmosphere, thereby producing $Zr_8Fe_1Co_1O_xN_y/C$, where x is about 0.2 and y is 1. In this case, the amount of $Zr_8Fe_1Co_1O_xN_y$ that is an active component is 20 parts by weight based on 100 parts by weight of the total weight of the catalyst.

COMPARATIVE SYNTHESIS EXAMPLE 1

Preparation of $ZrO_xN_y/C$ where x is 0.2 and y is 1

26.18 mg of $ZrO(NO_3)_2.2H_2O$ is mixed with water to prepare a precursor solution.

Separately, 0.4 g of XC-72 carbon black is mixed with 80 parts by volume of water based on 20 parts by volume of ethanol to prepare a support slurry.

The precursor solution is mixed with the support slurry at 90° C. in an oil bath for 30 minutes and the resultant mixture is dried at 80° C. for 8 hours in a vacuum condition.

The result is heat treated at 900° C. for 30 minutes under an ammonia gas atmosphere, and then cooled to room temperature (20° C.) under a nitrogen atmosphere, thereby producing $ZrO_xN_y/C$ where x is 0.2 and y is 1. In this case, the amount of $ZrO_xN_y$ that is an active component is 20 parts by weight based on 100 parts by weight of the total weight of the catalyst.

The average particle size of each of the compounds prepared according to Synthesis Examples 1 and 2 and Comparative Synthesis Example 1 is identified with a transmission electron microscope. The results are shown in Table 1. In addition, transmission electron microscopic (TEM) images of the compounds prepared according to Synthesis Examples 1 and 2 and Comparative Synthesis Example 1 show that the average particle size of $Zr_4Co_1O_xN_y/C$ (Synthesis Example 1) and the average particle size of $Zr_4Fe_1O_xN_y/C$ (Synthesis Example 2) are smaller than the average particle size of $ZrO(NO_3)_2.2H_2O$ (Comparative Synthesis Example 1).

TABLE 1

| Sample | | Average Particle Size (nm) |
|---|---|---|
| $ZrO_xN_y/C$ | x is 0.2 and y is 1 | 9.0 |
| $Zr_4CoO_xN_y/C$ | x is 0.2 and y is 1 | 5.4 |
| $Zr_4FeO_xN_y/C$ | x is 0.2 and y is 1 | 5.0 |

EXAMPLE 1

Manufacture of Fuel Cell Electrode and Fuel Cell Using the Same 1 g of $Zr_4Co_1O_xN_y/C$, where x is 0.2 and y is 1, prepared according to Synthesis Example 1 and 3 g of NMP (as a solvent) are loaded into an agitating vessel and the mixture is stirred to prepare a slurry.

An NMP solution of 5 weight % polyvinylidenefluoride is added to the slurry until the amount of polyvinylidenefluoride reaches 0.025 g and then the resultant mixture is mixed for 10 minutes, thereby forming a cathode catalyst layer forming slurry.

Carbon paper is cut to a size of 4×7 cm² and fixed to a glass plate. A doctor blade (Sheen instrument) is used to coat the cathode catalyst layer forming slurry on the carbon paper. In this case, the gap interval is 600° C.

Then the cathode catalyst layer forming slurry coated on the carbon paper is dried at room temperature for 1 hour, at 80° C. for 1 hour, at 120° C. for 30 minutes, and at 150° C. for 15 minutes, thereby forming a cathode (air electrode).

An electrode manufactured using the following method is used as an anode.

2 g of a catalyst that is 50 weight % Pt carried in a carbonaceous catalyst and 9 g of NMP that is a solvent are loaded into an agitating vessel and the mixture is stirred using a high-speed stirrer for 2 minutes.

Then, a solution prepared by dissolving 0.05 g of polyvinylidenefluoride in 1 g of NMP is added thereto and the resultant mixture is further stirred for 2 minutes to prepare an anode catalyst layer forming slurry. The anode catalyst layer forming slurry is then coated using a bar coater on carbon paper coated with a microporous layer, thereby forming an anode.

A polybenzimidazole electrolytic membrane is immersed in 85 weight % of phosphoric acid at 80° C. for at least 4 hours, thereby forming an electrolytic membrane. In the formed electrolytic membrane, the amount of the phosphoric acid is about 480 parts by weight based on 100 parts by weight of the total weight of the polybenzimidazole electrolytic membrane.

The electrolytic membrane is interposed between the cathode and the anode to form an MEA. In this regard, the cathode and the anode are not immersed in the phosphoric acid.

To prevent gas permeation between the cathode and the anode, a 200 μm-thick TEFLON layer that is a main gasket and a 20 μm-thick TEFLON layer that is a sub gasket are disposed on each of the anode and cathode disposed on both sides of the electrolytic membrane. Pressure applied to the MEA is adjusted with a torque wrench, and is gradually increased to 1, 2, and 3 N-m Torque.

Characteristics of a battery are evaluated at a temperature of 150° C. under a non-humidity condition with respect to the electrolytic membrane while hydrogen is supplied to the anode and air is supplied to the cathode to generate power. In this case, since the electrolytic membrane is doped with the phosphoric acid, performance of the fuel cell is increased over time. Accordingly, the evaluation is performed after the battery is aged until the driving voltage reaches the upper limit.

EXAMPLE 2

Manufacture of Fuel Cell Electrode and Fuel Cell Using the Same

A cathode and a fuel cell using the same are manufactured in the same manner as in Example 1, except that the cathode is manufactured using $Zr_4Fe_1O_xN_y/C$ where x is 0.2 and y is 1 prepared according to Synthesis Example 2.

EXAMPLE 3

Manufacture of Fuel Cell Electrode and Fuel Cell Using the Same

A cathode and a fuel cell using the same are manufactured in the same manner as in Example 1, except that the cathode is manufactured using $Zr_8Fe_1Co_1O_xN_y/C$ where x is 0.2 and y is 1 prepared according to Synthesis Example 3.

COMPARATIVE EXAMPLE 1

Manufacture of Fuel Cell Electrode and Fuel Cell Using the Same

A cathode and a fuel cell using the same are manufactured in the same manner as in Example 1, except that the cathode is manufactured using $ZrO_xN_y/C$ where x is 0.2 and y is 1 prepared according to Comparative Synthesis Example 1.

Figure 3:
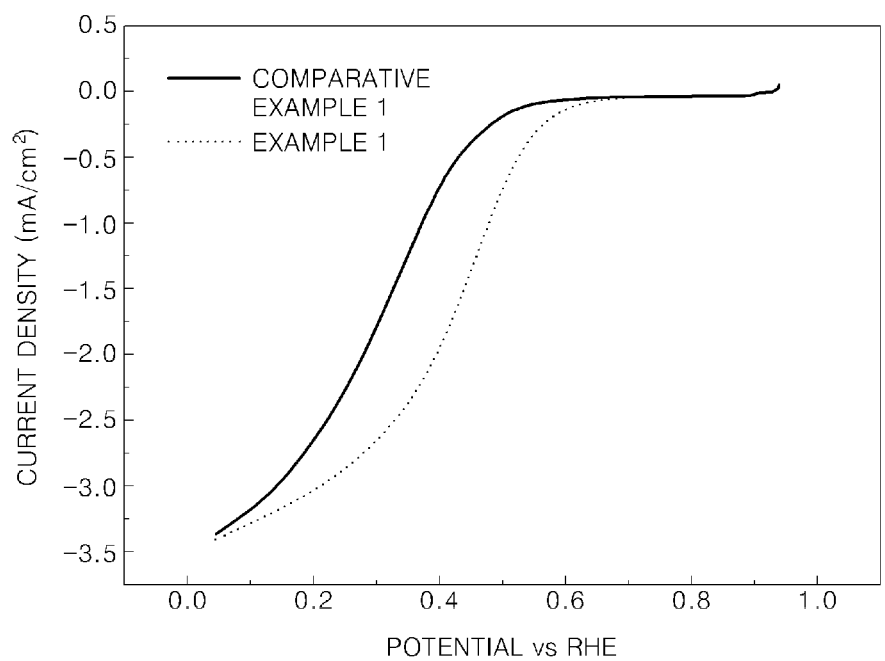
FIG. 3 is a graph illustrating characteristics of an oxygen reduction reaction (ORR) of a catalyst of fuel cells manufactured according to Example 1 and Comparative Example 1 in $O_2$ saturated 0.5M $H_2SO_4$.

With regard to the fuel cells manufactured according to Example 1 and Comparative Example 1, oxygen reduction reaction (ORR) characteristics of a catalyst in $O_2$ saturated 0.5M $H_2SO_4$ is evaluated. FIG. 3 is a graph illustrating the ORR characteristics of the catalyst of the fuel cells manufactured according to Example 1 and Comparative Example 1 in $O_2$ saturated 0.5M $H_2SO_4$.

Referring to FIG. 3, it can be seen that ORR activity of $Zr_4CO_1O_xN_y/C$ is higher than that of $ZrO_xN_y/C$.

Figure 4:
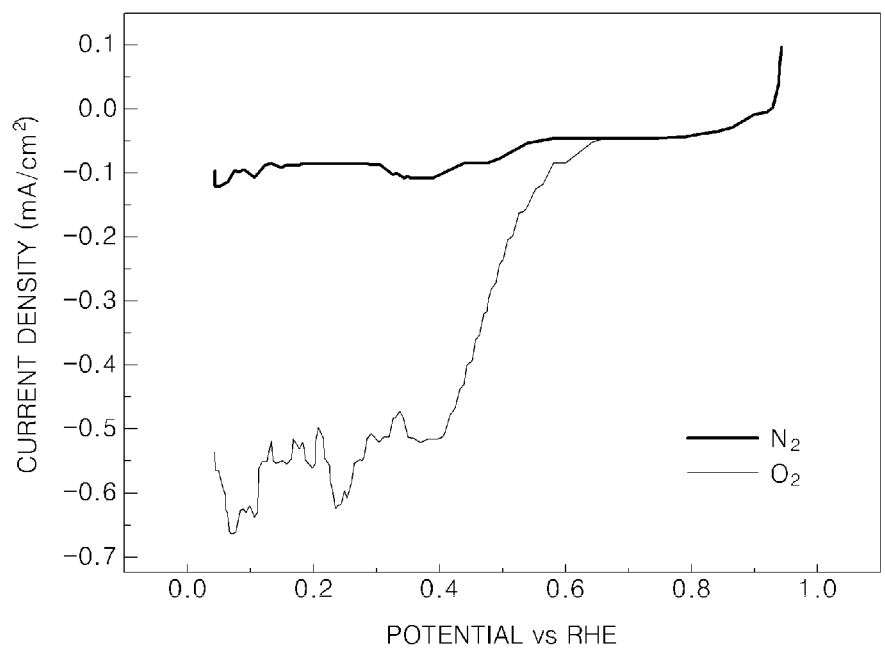
FIG. 4 is a graph illustrating characteristics of an oxygen reduction reaction (ORR) of a catalyst of the fuel cell manufactured according to Comparative Example 1 in $O_2$ saturated 0.5M $H_2SO_4$.

FIG. 4 is a graph illustrating characteristics of an oxygen reduction reaction (ORR) of a catalyst of the fuel cell manufactured according to Comparative Example 1 in $O_2$ saturated 0.5M $H_2SO_4$. Referring to FIG. 4, it can be seen that ORR does not occur under a nitrogen atmosphere.

Figure 5:
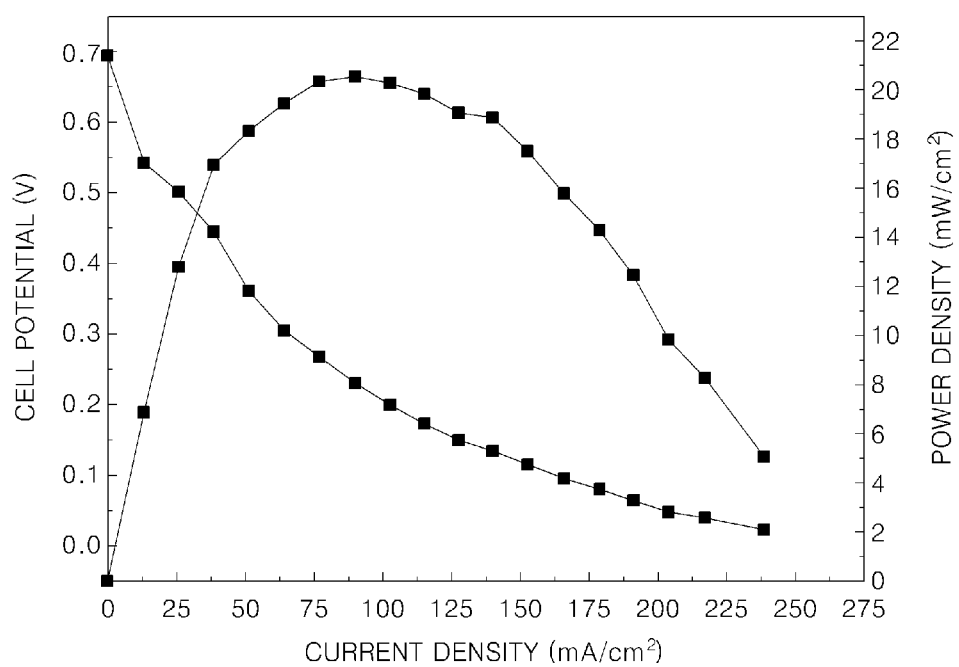
FIGS. 5 through 7 are graphs of cell voltage and power density with respect to current density of fuel cells prepared according to Examples 1 and 3 and Comparative Example 1.
Figure 6:
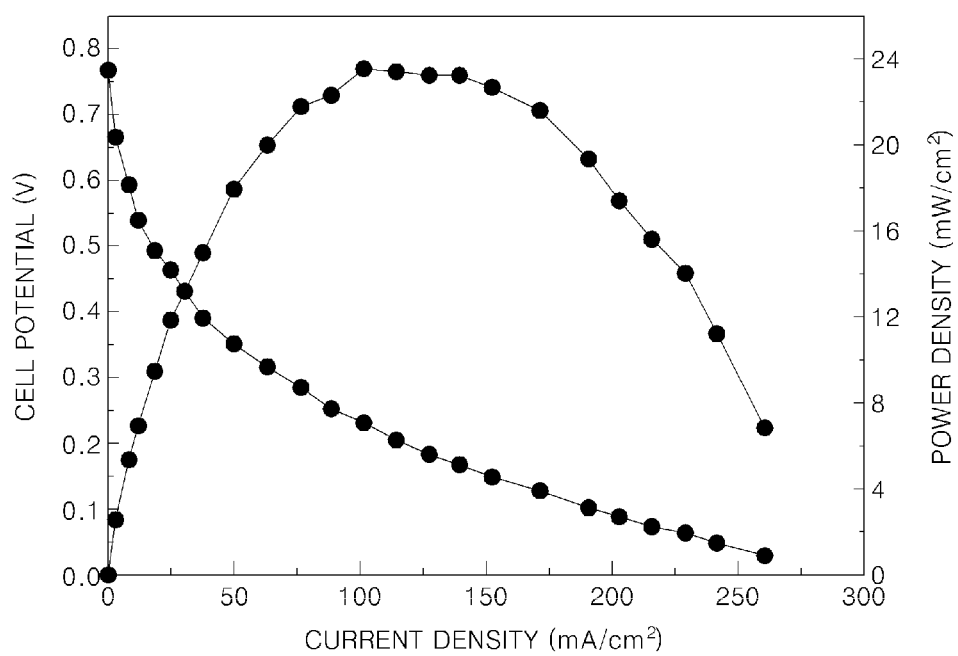
Figure 7:
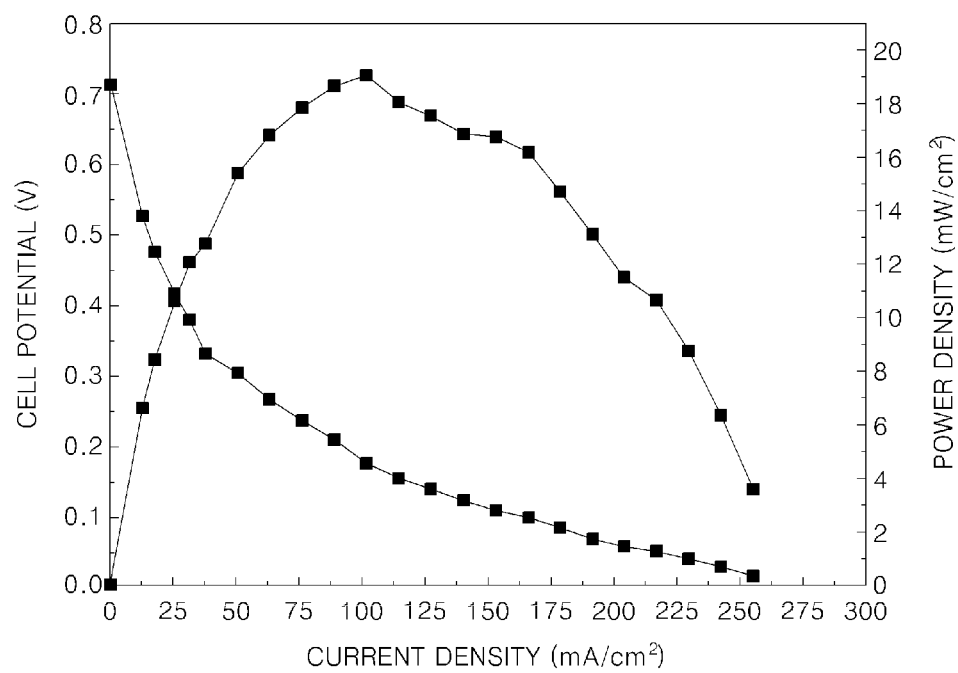

With regard to the fuel cells manufactured according to Examples 1 and 3 and Comparative Example 1, cell voltage and power density with respect to current density are measured. FIGS. 5 through 7 are graphs of cell voltage and power density with respect to current density of the fuel cells prepared according to Examples 1 and 3 and Comparative Example 1.

Referring to FIGS. 5 through 7, it can be seen that the fuel cells manufactured according to Examples 1-3 have higher cell voltage and power density than the fuel cell manufactured according to Comparative Example 1. Accordingly, it can be seen that the catalysts prepared according to Synthesis Example 1 and Synthesis Example 3 have higher activity than the catalyst prepared according to Comparative Synthesis Example 1.

As described above, according to the one or more of the above embodiments, ORR and power density characteristics of a fuel cell catalyst can be controlled by using a novel non-noble metal based catalyst having high activity.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A non-noble metal based catalyst comprising a compound represented by Formula 1:

$$Zr_aM_bO_xN_y \qquad \text{[Formula 1]}$$

where M comprises at least one element selected from Group 4 elements through Group 12 elements,
a is a number in the range of about 1 to about 8,
b is a number in the range of about 1 to about 8,
x is a number in the range of about 0.2 to about 32, and
y is a number in the range of about 0.2 to about 16.

2. The non-noble metal based catalyst of claim 1, wherein the compound represented by Formula 1 is a compound represented by Formula 2:

$$Zr_aM1_cM2_dO_xN_y \qquad \text{[Formula 2]}$$

where M1 and M2 are different metals selected from Group 4 elements to Group 12 elements,
a is a number in the range of about 1 to about 8,
c is a number in the range of about 1 to about 8,
d is a number in the range of about 1 to about 8,
x is a number in the range of about 0.2 to about 48, and
y is a number in the range of about 0.2 to about 48.

3. The non-noble metal based catalyst of claim 1, wherein in Formula 1, M comprises at least one element selected from the group consisting of titanium (Ti), vanadium (V), chromium (Cr), manganese (Mn), molybdenum (Mo), tungsten (W), iron (Fe), cobalt (Co), nickel (Ni), copper (Cu), and zinc (Zn).

4. The non-noble metal based catalyst of claim 1, wherein in Formula 1, an atomic ratio of Zr to M is in a range of about 1:8 to about 8:1.

5. The non-noble metal based catalyst of claim 1, further comprising a carbonaceous support.

6. The non-noble metal based catalyst of claim 1, wherein the amount of the compound represented by Formula 1 is in a range of about 5 to about 80 parts by weight based on 100 parts by weight of the total weight of the non-noble metal based catalyst.

7. The non-noble metal based catalyst of claim 1, wherein the compound represented by Formula 1 is selected from the group consisting of $Zr_4Co_1O_xN_y/C$, $Zr_4Fe_1O_xN_y/C$, $Zr_5Cu_1O_xN_y/C$, $Zr_3Ni_1O_xN_y/C$, $Zr_3Cr_1O_xN_y/C$, $Zr_2Zn_1O_xN_y/C$, $Zr_1Ti_1O_xN_y/C$, $Zr_1V_2O_xN_y/C$, $Zr_1Mn_3O_xN_y/$ C, $Zr_1Mo_4O_xN_y/C$, $Zr_1W_5O_xN_y/C$, $Zr_2Fe_5O_xN_y/C$, and $Zr_1Co_{10}O_xN_y/C$, where x is a number in the range of about 0.2 to about 32 and y is a number in the range of about 0.2 to about 16.

8. The non-noble metal based catalyst of claim 2, wherein the compound represented by Formula 2 is selected from the group consisting of $Zr_8Co_1Mn_1O_xN_y/C$, $Zr_6Fe_2Mn_1O_xN_y/C$, $Zr_8Fe_1Co_1O_xN_y/C$, $Zr_6Fe_1Zn_1O_xN_y/C$, $Zr_6Ni_1Zn_1O_xN_y/C$, and $Zr_6V_1Zn_1O_xN_y/C$, wherein x and y are numbers in the range of about 0.2 to about 48.

9. An electrode for a fuel cell, the electrode comprising the non-noble metal based catalyst of claim 1.

10. An electrode for a fuel cell, the electrode comprising the non-noble metal based catalyst of claim 2.

11. An electrode for a fuel cell, the electrode comprising the non-noble metal based catalyst of claim 4.

12. An electrode for a fuel cell, the electrode comprising the non-noble metal based catalyst of claim 5.

13. A fuel cell comprising: a cathode; an anode; and an electrolytic membrane interposed between the cathode and the anode, wherein at least one of the cathode and the anode comprises the non-noble metal based catalyst of claim 1.

14. A fuel cell comprising: a cathode; an anode; and an electrolytic membrane interposed between the cathode and the anode, wherein at least one of the cathode and the anode comprises the non-noble metal based catalyst of claim 2.

15. A fuel cell comprising: a cathode; an anode; and an electrolytic membrane interposed between the cathode and the anode, wherein at least one of the cathode and the anode comprises the non-noble metal based catalyst of claim 4.

16. A fuel cell comprising: a cathode; an anode; and an electrolytic membrane interposed between the cathode and the anode, wherein at least one of the cathode and the anode comprises the non-noble metal based catalyst of claim 5.

* * * * *